Figure 1:
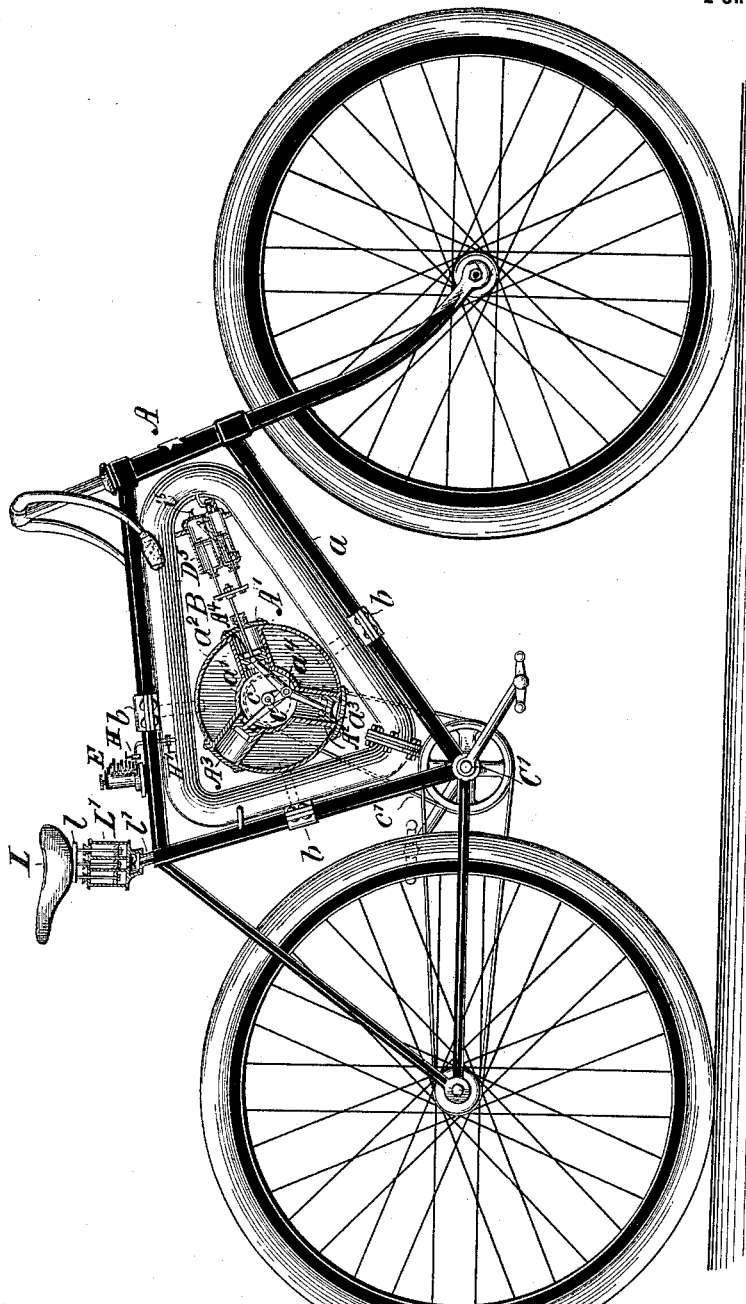

No. 626,440. Patented June 6, 1899.
J. F. RADERS.
MOTOR BICYCLE.
(Application filed Feb. 17, 1896.)
(No Model.) 2 Sheets—Sheet 1.

WITNESSES:
INVENTOR;
Joseph F. Raders,
BY
HIS ATTORNEY.

THE NORRIS PETERS CO., PHOTO-LITHO., WASHINGTON, D. C.

No. 626,440. Patented June 6, 1899.
J. F. RADERS.
MOTOR BICYCLE.
(Application filed Feb. 17, 1896.)
(No Model.) 2 Sheets—Sheet 2.
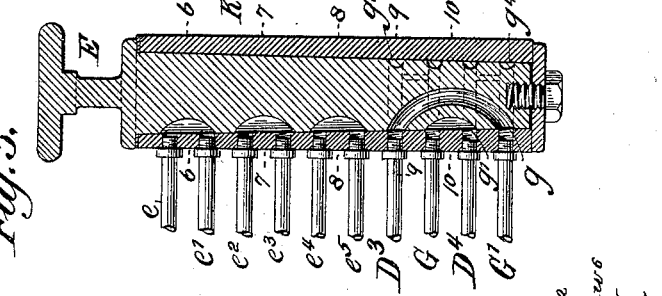
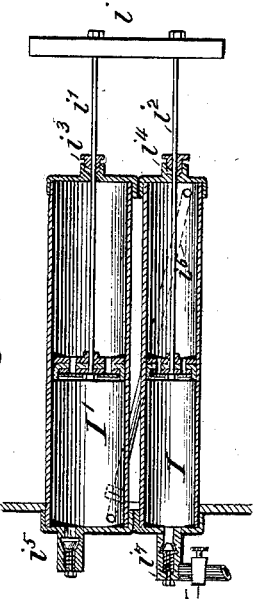
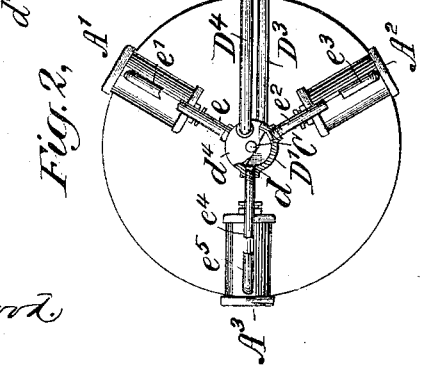
WITNESSES:
INVENTOR
Joseph F. Raders
BY
HIS ATTORNEY.

UNITED STATES PATENT OFFICE.

JOSEPH F. RADERS, OF NEW YORK, N. Y., ASSIGNOR, BY DIRECT AND MESNE ASSIGNMENTS, OF ONE-HALF TO EDWARD N. DICKERSON, OF SAME PLACE.

MOTOR-BICYCLE.

SPECIFICATION forming part of Letters Patent No. 626,440, dated June 6, 1899.

Application filed February 17, 1896. Serial No. 579,685. (No model.)

*To all whom it may concern:*

Be it known that I, JOSEPH F. RADERS, of New York, (Flushing,) Queens county, New York, have invented a certain new and useful Improvement in Bicycles having Mechanical Means Assisting in their Propulsion, of which the following is a specification.

This invention embraces means and the adaptation of the same to a bicycle or similar vehicle, acting as an auxiliary aid to the rider in the propulsion of the machine.

The means embraced in the invention are designed more particularly to act temporarily independently of or in conjunction with the usual foot propelling mechanism rather than as the sole means for moving the machine at any and all times.

The invention further embodies means which during the running of the cycle operate to compress and store air utilized subsequently to actuate the propelling mechanism.

An embodiment of my invention, which I shall now proceed to describe and whose novelty will afterward be pointed out in the claims, is illustrated in the accompanying drawings, in which—

Figure 1 is a side elevation of a bicycle provided with a device embodying my invention. Fig. 2 is a view, on a larger scale, partly in elevation and partly in section of cylinders and their connections embraced in the propelling mechanism. Fig. 3 is a side elevation of a rotary valve for controlling the flow of motive fluid to and from the cylinders. Fig. 4 is a cross-section on the line 4 4 of Fig. 3. Fig. 5 is a longitudinal section through a valve for connecting and disconnecting at will various passage-ways with and from each other. Figs. 6, 7, 8, 9, and 10 are cross-sections on the planes of the lines 6 6, 7 7, 8 8, 9 9, and 10 10, respectively, in Fig. 5. Fig. 11 is a longitudinal section through a pump embodied in the invention. Fig. 12 is an enlarged sectional view of a check-valve adapted to be thrown into or out of action.

Similar letters of reference designate corresponding parts in all figures.

A represents the bicycle to which the invention is applied. It has the usual diamond-shaped frame $a$, to the forward bars of which is secured a reservoir B for compressed air. Preferably this reservoir is of the shape shown, and it may consist of pipe bent to a triangular shape and fastened to the frame by clamps $b$. It will be of a strength sufficient to withstand a high pressure.

It is the intention in the operation of this invention to make use of the jolting movements of the rider to effect a compression of air and its storage in the reservoir B. Provision is also made by which additional compression and storage may be derived from the surplus energy developed by the bicycle—as, for instance, while it is descending an incline. Air thus compressed and under the control of the rider may be led from the reservoir and serve as the motive fluid in a suitable device in operative connection with the driving-wheel of the bicycle, and thus be added to the effort exerted by the feet of rider to propel the cycle. The mechanism may even serve for a time as the only means urging the machine forward.

I have shown a three-cylinder engine adapted to be actuated by the compressed air, the cylinders being designated as $A'$, $A^2$, and $A^3$. They are conveniently secured to rings $a'$ $a^2$ and the connected parts rigidly attached to the reservoir B or directly to the frame A. The cylinders are single-acting and provided with trunk-pistons $A^4$, from each of which extends a connecting-rod $a^3$, taking hold of a crank-pin $a^4$ at the opposite end. The crank serves to rotate a shaft C, mounted in suitable bearings and provided with a sprocket-wheel $c$, connecting with the ordinary pedal crank-shaft $C'$ by a chain and sprocket-wheel connection $c'$. Suitable passage-ways extend from the outer end of each of the cylinders $A'$ $A^2$ $A^3$ to a valve casing or chest $D'$, through the walls of which they pass by ports $d$. The valve $D^2$, controlling the movement of the air to and from the cylinders, is rigidly secured to the shaft C and works in the casing $D'$. It is provided with a short port $d'$ and a long port $d^2$, extending around the periphery of the valve, the former of which serves as an air-inlet to the several cylinders and the latter performing the functions of an exhaust-outlet. The two ports or openings $d'$ and $d^2$ in the valve are separated from each other by a partition $d^3$, which divides the interior of the valve into two chambers. The casing D' is provided with end plates $d^4$, completely inclosing these chambers, and to their respective chambers the inlet and exhaust pipes $D^3$ $D^4$ are affixed.

$D^5$ is an air compressor or pump, presently to be described, operated from a piston of one of the aforesaid cylinders and serving to force air into the reservoir B when the bicycle is running freely of itself and developing surplus energy which it is desired to store.

I have also adapted the cylinders A' $A^2$ $A^3$ to be used as compressors when desirable to store air in the reservoir B, so constructing the apparatus that either one, two, or all three of the cylinders may be so used. To this end, instead of extending the passageways directly from a cylinder to the valve-casing D', I extend conduits connecting with the casing and with the cylinder end to a plug-valve E, to the casing of which latter the ends of the conduits are rigidly secured. Suitable recesses are provided in the body of the valve, connecting the proper conduits or pipes with each other. These recesses are of such size and arrangement as to successively cut off communication between the cylinders and main supply-valve upon the shaft during the rotation of the plug-valve. The pipes leading from the valve E to the cylinder A' and to the valve-casing D' are marked $e$ $e'$. Those for the cylinder $A^2$ are marked $e^2$ $e^3$, and those for the cylinder $A^3$ are marked $e^4 e^5$.

To convert the three cylinders A' $A^2$ $A^3$ into compressors, it is necessary that the passageway which ordinarily serves to receive air from the reservoir B should be open to the atmosphere and that opening which ordinarily forms the exhaust of the engine or is open to the atmosphere should be connected with the reservoir. The inlet and exhaust pipes $D^3 D^4$ extend from the valve-casing D' aforesaid to the valve E, to the casing of which they, as well as pipes C C', leading, respectively, to the atmosphere and from reservoir B, are secured. Normally or while the cylinders are acting as engines to propel the machine a recess $g$ in the body of the valve places the pipe C', leading from the reservoir, in communication with the pipe $D^3$, leading to the inlet to the cylinders, and an independent opening $g'$ places the pipe $D^4$, leading from the exhaust side of valve $D^2$, in communication with the air-outlet G. When, however, the valve E, which may be located at any convenient point on the bicycle, is given a slight turn, pipes $D^3$ G are placed in communication by peripheral recesses and cross-connection $g^3$, and pipes G' and $D^4$ are also placed in communication by similar recesses $g^4$, thus converting the cylinders into compressors. This connection is maintained during subsequent rotation of the valve, which successively cuts out cylinders A' $A^2$ $A^3$ until it again returns to its normal position. The pipe G', leading to the reservoir, may be provided with a stop-valve H, and a check-valve H' is also provided, which is so constructed that it may be thrown into operative position when compression from one or more cylinders is taking place, but may be rendered inoperative when the cylinders are acting to propel the machine. A construction accomplishing this end is shown in Fig. 12, in which two chambers W W' are formed in the valve-body, the partition $w^3$ between the two chambers being provided with a valve-seat for the valve $w^5$. The portion of the pipe G' between the reservoir B and valve H' communicates with chamber W' above the valve through port $w^6$, while the portion of the pipe between the valve H' and valve E communicates with the chamber W below the valve through port $w$. The spring $w^4$ embraces the valve-stem $w^7$, urging the valve to its seat. When it is desired that the valve shall be held away from its seat, there is provided a boss or projection $w'$ upon the valve-stem, which when the latter is turned contacts with the boss $w^2$ upon the top of the valve-casing and by riding up upon the same causes the stem and valve to be elevated and held in this elevated position.

The pump $D^5$ comprises a cylinder I of relatively small diameter and one or more cylinders I' of larger diameter. The pistons of these cylinders are connected by a cross-head $i$, attached to piston-rods $i'$ $i^2$, passing through stuffing-boxes $i^3$ $i^4$ in the ends of the cylinders I I'. The larger cylinder I' is provided with a valve-controlled air-inlet $i^5$, while its outlet is through a valve-controlled conduit $i^6$, extending from near the bottom of the cylinder to near the top of the smaller cylinder I. The piston of this latter cylinder is provided with the valve Z, permitting air to flow from one end of the cylinder to the other and finally discharge into the air-reservoir B through a suitable valve-controlled passageway $i^7$. This pump is provided with suitable means for rendering it inoperative. For instance, a valve K may be provided, throwing the discharge into the atmosphere when properly positioned.

It is also a feature of the invention to utilize the jolting movements of the rider as a means for further compressing air into the reservoir. For this purpose I secure the saddle L to the cross-head $l$ of an air-compression pump L', preferably similar in construction to the one already described, which discharges through a suitable valve-controlled passageway $l'$ into the reservoir B.

Having described my invention, what I consider as new, and desire to secure by Letters Patent, is—

1. The combination with the pedal crank-shaft of a bicycle, or similar vehicle, of an engine, comprising a number of cylinders, mechanically connected to said shaft for propelling or assisting in the propulsion of the bicycle, a storage-reservoir mounted upon the bicycle, pipes or passage-ways connecting said engine with said reservoir, and a valve interposed in said pipes or passage-ways for connecting the same in different relations to each other, whereby at the will of the rider, the said engine may be used as such to operate the pedal crank-shaft, or the said cylinders may be converted into compressors for storing air in said reservoir, said valve also operating to render one or more of these compressor-cylinders inoperative, substantially as specified.

2. The combination of an engine comprising a number of cylinders, a shaft driven by said engine, a storage-reservoir, pipes or passage-ways connecting said reservoir with said engine, and a valve interposed in said pipes or passage-ways for connecting the same in different relations with each other, whereby said engine may be used as such to operate said shaft, or be converted into a compressor for storing air in said reservoir, said valve also operating to successively render said cylinders inoperative, substantially as specified.

3. The combination of the following elements: a storage-reservoir for compressed air; an engine; passage-ways extending between said reservoir and said engine whereby said engine may be operated by compressed air from said reservoir; a plurality of cylinders comprised in said engine, said cylinders being convertible into compressors acting to store air in said reservoir; means for rendering said cylinders inoperative; a differential pump, and a shaft in connection therewith whereby said pump is driven by said engine, substantially as and for the purpose specified.

4. The combination with a bicycle, of an engine comprising a number of cylinders, a shaft driven by the engine, a storage-reservoir, passage-ways extending between said cylinders and said storage-reservoir, and a valve with which said passage-ways communicate, whereby the cylinders comprised in said engine can be converted into compressors and then successively rendered inoperative, substantially as specified.

5. A bicycle or similar vehicle having a storage-reservoir whose general shape conforms to the upper and lower front bars of the bicycle-frame and the saddle-post bar, to which bars the said reservoir is secured, in combination with an engine secured within the space defined by the said reservoir, substantially as and for the purpose specified.

6. In a bicycle or similar vehicle, the combination of a pedal crank-shaft, an engine comprising a number of cylinders mechanically connected with said shaft for propelling or assisting in the propulsion of the bicycle, a storage-reservoir, a valve located within convenient reach of the rider, pipes or passage-ways connecting said valve with said engine, a pipe or passage-way connecting said reservoir with said valve, a check-valve interposed in said last-mentioned pipe or passage-way, and means for rendering said check-valve inoperative, the first-mentioned valve being constructed to permit the first-mentioned connecting pipes or passage-ways to be placed in different relations with each other, whereby the said engine may be used as such, or the said cylinders may be converted into compressors for storing air in the said reservoir, substantially as specified.

7. The combination with the pedal crank-shaft of a bicycle or similar vehicle, of an engine comprising a number of cylinders, an engine-shaft mechanically connected with the said pedal crank-shaft, pistons in said cylinders operatively connected with said engine-shaft, a storage-reservoir, an air-pump connected with said engine-shaft acting to store air in said reservoir, pipes or passage-ways connecting said reservoir with said engine, a valve interposed in said pipes or passage-ways for connecting said pipes or passage-ways in different relations to each other, whereby the said engine may be used as such to operate the pedal crank-shaft, or the several cylinders be converted into compressors for storing air in said reservoir, said valve also operating to render one or more of these compressor-cylinders inoperative, and means for rendering the said air-pump inoperative, substantially as and for the purpose specified.

In witness whereof I have signed my name in the presence of two subscribing witnesses.

JOSEPH F. RADERS.

Witnesses:
PIERSON L. WELLS,
A. P. WELLS.